US009430199B2

(12) United States Patent
Glaister et al.

(10) Patent No.: US 9,430,199 B2
(45) Date of Patent: Aug. 30, 2016

(54) SCALAR OPTIMIZATIONS FOR SHADERS

(75) Inventors: Andy Glaister, Redmond, WA (US); Blaise Pascal Tine, Lynnwood, WA (US); Derek Sessions, Bellevue, WA (US); Mikhail Lyapunov, Woodinville, WA (US); Yuri Dotsenko, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/398,793

(22) Filed: Feb. 16, 2012

(65) Prior Publication Data

US 2013/0219377 A1   Aug. 22, 2013

(51) Int. Cl.
*G06F 9/45* (2006.01)
*G06T 15/00* (2011.01)
*G06F 9/455* (2006.01)

(52) U.S. Cl.
CPC .............. *G06F 8/433* (2013.01); *G06F 8/452* (2013.01); *G06T 15/005* (2013.01); *G06F 9/45525* (2013.01)

(58) Field of Classification Search
CPC ..................................... G06F 8/452
USPC ........................................ 717/146
See application file for complete search history.

(56) References Cited

U.S. PATENT DOCUMENTS

| 7,466,318 B1 | 12/2008 | Kilgard |  |
|---|---|---|---|
| 2005/0028141 A1* | 2/2005 | Kurhekar et al. | 717/119 |
| 2009/0259996 A1* | 10/2009 | Grover et al. | 717/136 |
| 2011/0119660 A1* | 5/2011 | Tanaka | 717/149 |
| 2011/0153992 A1* | 6/2011 | Srinivas | G06F 9/45516 712/220 |
| 2011/0173414 A1* | 7/2011 | Juffa et al. | 712/22 |
| 2012/0216015 A1* | 8/2012 | Mitra | 712/28 |

OTHER PUBLICATIONS

Lindholm et al., "NVIDIA Tesla A unified graphics and computing architecture", Mar. 2008, IEEE Computer Society, p. 39-55.*
McCabe, "Global data flow analysis on intermediate code", 1992, Doctoral Dissertation, Dublin City University.*
Leung et al. "A Mapping Path for multi-GPGPU Accelerated Computers from a Portable High Level Programming Abstraction", Mar. 14, 2010, ACM, GPGPU '10, p. 51-61.*
Lee, et al., "Many-Thread Aware Prefetching Mechanisms for GPGPU Applications", Retrieved at <<http://comparch.gatech.edu/hparch/lee_micro10.pdf>>, 43rd Annual IEEE/ACM International Symposium on Microarchitecture, MICRO, Dec. 4-8, 2010, pp. 213-224.

(Continued)

*Primary Examiner* — Li B Zhen
*Assistant Examiner* — Sen Chen
(74) *Attorney, Agent, or Firm* — Sunah Lee; Judy Yee; Micky Minhas

(57) ABSTRACT

Described herein are optimizations of thread loop intermediate representation (IR) code. One embodiment involves an algorithm that, based on data-flow analysis, computes sets of temporary variables that are loaded at the beginning of a thread loop and stored upon exit from a thread loop. Another embodiment involves reducing the size of a thread loop trip for a commonly-found case where a piece of compute shader is executed by a single thread (or a compiler-analyzable range of threads). In yet another embodiment, compute shader thread indices are cached to avoid excessive divisions, further improving execution speed.

15 Claims, 3 Drawing Sheets

(56) References Cited

OTHER PUBLICATIONS

Gou, et al., "Elastic pipeline: Addressing GPU on-chip shared memory bank conflicts", Retrieved at <<http://ce.et.tudelft.nl/publicationfiles/2021_739_>>, Proceedings of the 8th ACM International Conference on Computing Frontiers, May 3-5, 2011, pp. 11.

Di, et al., "Model-driven tile size selection for DOACROSS loops on GPUs", Retrieved at <<http://www.cse.unsw.edu.au/~jingling/papers/europar11.pdf>>, 17th International Conference, Euro-Par 2011: GPU and Accelerators Computing, Aug. 29-Sep. 2, 2011, pp. 401-412.

Yang, et al., "A GPGPU Compiler for Memory Optimization and Parallelism Management", Retrieved at <<http://www.eecs.ucf.edu/~zhou/pldi10.pdf>>, Proceedings of the 2010 ACM SIGPLAN Conference on Programming Language Design and Implementation, PLDI, Jun. 5-10, 2010, pp. 86-97.

Govindaraju, et al., "High Performance Discrete Fourier Transforms on Graphics Processors", Retrieved at <<http://mc.stanford.edu/cgi-bin/images/7/75/SC08_FFT_on_GPUs.pdf>>, Proceedings of the ACM/IEEE Conference on High Performance Computing, SC, Nov. 15-21, 2008, pp. 1-12.

Woo, et al., "Chameleon: Virtualizing idle acceleration cores of a heterogeneous multi-core processor for caching and prefetching", Retrieved at <<http://www.cercs.gatech.edu/tech-reports/tr2008/git-cercs-08-11.pdf>>, Technical Report, GIT-CERCS-08-11, Dec. 2008, pp. 1-25.

Woo, et al., "COMPASS: A Programmable Data Prefetcher Using Idle GPU Shaders", Retrieved at <<http://arch.ece.gatech.edu/pub/asplos15.pdf>>, Proceedings of the 15th International Conference on Architectural Support for Programming Languages and Operating Systems, ASPLOS, Mar. 13-17, 2010, pp. 13.

* cited by examiner

SCALAR OPTIMIZATIONS FOR SHADERS

BACKGROUND

Recent trends indicate significant increase in the use of GPUs (graphics processing units) for general-purpose computing (GPGPU). That is, GPUs are tending to be used for computing not necessarily related to computer graphics, such as physics simulation, video transcoding, and other data-parallel computing. Furthermore, the introduction of on-chip shared memory in GPUs has led to marked performance improvements for widely-used compute-intensive algorithms such as all-prefix sum (scan), histogram computation, convolution, Fast Fourier Transform (FFT), physics simulations, and more. Microsoft Corporation offers the Direct X™ HLSL (High Level Shading Language)™ Compute Shader as a software API (application programming interface) to access and utilize shared memory capabilities. Note that Direct X, the HLSL, and Compute Shader will be referred to as examples, with the understanding that comments and discussion directed thereto are equally applicable to other shading languages such as CUDA (Compute Unified Device Architecture), OpenCL (Open Compute Language), etc. These will be referred to generically as "compute shaders".

A complete software platform should provide efficient software rasterization of a compute shader (or the like) on CPUs to provide a fallback when GPU hardware is not an option, or when the software platform is used in a headless VM (Virtual Machine) scenario, without the need to implement both GPU and CPU hardware solutions. That is, it is sometimes desirable to execute shader language code on a CPU rather than a GPU. However, mapping GPU-centric compute shaders onto CPUs efficiently is non-trivial primarily due to thread synchronization, which is enforced by thread barriers (or syncs).

To address this problem, techniques have been developed to partition a compute shader into maximal-size regions, called thread loops, thus allowing compute shader code to be mapped efficiently to CPUs despite the presence of thread barriers. For that technique, see commonly assigned U.S. patent application Ser. No. 13/398,798, titled "RASTERIZATION FOR COMPUTE SHADERS", filed Feb. 16, 2012, and incorporated by reference herein. While thread loop transformations are helpful, thread loops may be subjected to optimizations that improve their efficiency when running on a CPU.

Techniques discussed below relate to optimizing thread loop configuration and execution.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are optimizations of thread loop intermediate representation (IR) code. One embodiment involves an algorithm that, based on data-flow analysis, computes sets of temporary variables that are loaded at the beginning of an iteration of a thread loop and stored upon completion of a thread loop iteration. Another embodiment involves reducing the size of a thread loop trip for a commonly-found case where a piece of compute shader is executed by a single thread (or a compiler-analyzable range of threads). In yet another embodiment, compute shader thread indices are cached to avoid excessive divisions, further improving execution speed.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to efficiently optimizing transformed scalar code to execute with improved speed, including optimizations that are specific for compute shaders. It is assumed that a compute shader has already been partitioned into maximal-size regions, called thread loops, as described in the above-referenced patent application, such that the transformed program does not contain barriers, performs equivalent computations as the original shader (will produce same output as original shader given same input), and is suitable for efficient execution by a single CPU thread, rather than GPU hardware. It also may be assumed herein that a vectorization pass is done after the scalar optimizations performed herein, as described in U.S. patent application Ser. No. 13/398,797, filed Feb. 16, 2012, titled "VECTORIZATION OF SHADERS".

The scalar optimizations to be described include the following. First, an algorithm that, based on data-flow analysis, computes sets of variables that need to be loaded at the beginning of a thread loop iteration and stored upon completion of a thread loop iteration (i.e., on every iteration of a thread loop). Second, a technique of reducing the size of a thread loop trip for a commonly-found case where a piece of compute shader is executed by a single thread (or a compiler-analyzable range of threads). Third, a caching technique is used, where compute shader thread indices are pre-computed and cached to avoid excessive divisions.

The following terms used herein will be defined as follows. A compute shader thread block is an instance of the compute shader program; the Direct X 11™ Dispatch call, for example, typically creates multiple thread blocks. Each thread block has several compute-shader threads with private register sets. Threads within a thread block can share data using shared memory, which is private to the thread block, and use thread barriers for synchronization. A thread loop (t-loop) is a region of compute shader, induced by the original synchronization that must be executed by all threads of a thread block, before execution may proceed further. Each original variable v is privatized with respect to iterations of a t-loop; i.e., conceptually a scalar v becomes an array v[T], where thread t accesses only its own copy v[t], and where T is the number of threads. A variable v is live at some point P in a program if and only if it has been defined along some path from the entry to P and there is an execution path from P to a use of v along which v is not redefined. A variable is upward-exposed (UE) in a basic block B if it is used in B before any definition in B. A resource may be a texture, shader resource view (SRV, read-only), unordered access view (UAV, read and write) or shared memory.

Figure 1:
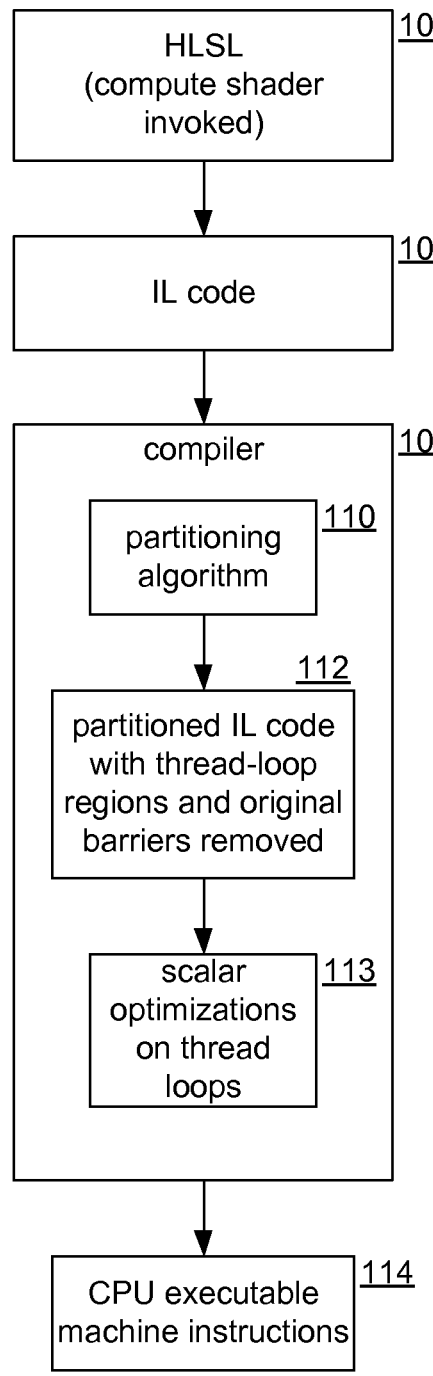
FIG. 1 shows a context for a compute shader partitioning algorithm.

FIG. 1 shows a context for a compute shader partitioning algorithm. Initially, shading language source code 100 such as a HLSL compute shader is compiled to produce intermediate language (IL) 102 code (i.e., intermediate representation (IR) code, bytecode, etc.) which may be intended for the parallelism of a GPU. Per compiler options or other environment or configuration settings, compiler 108 invokes a partitioning algorithm 110 that transforms the IL code 102 producing partitioned IL code 112 with regions (thread loops) and with barrier-based synchronization removed. Note that while a patent application mentioned above describes maximal-size thread loops, thread loops herein need not be maximized. That is, the scalar optimizations described herein will work with any partitioning of a compute shader. The partitioned IL code 112 is then compiled and possibly optimized by optimizations 113, as with any other IL, into CPU executable machine instructions 114 for execution in a CPU, which is not a GPU. The compiler 108 may be an online JIT compiler or it may be an offline compiler that produces a stored machine executable program.

Computation of Load and Store Sets for Each Thread Loop

Figure 2:
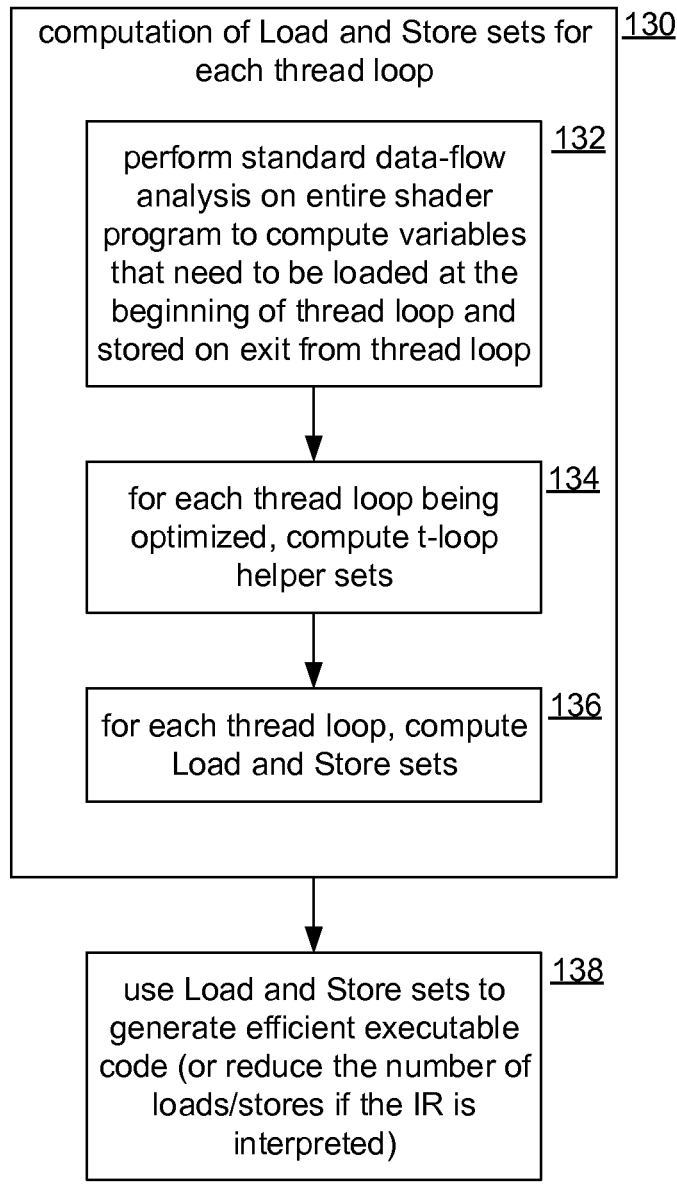
FIG. 2 shows an overview of computation and use of Load and Store sets for a thread loop.

FIG. 2 shows an overview of computation and use of Load and Store sets for a thread loop. At step 132, after thread loops have been inserted into the IR code, a liveness (data-flow) analysis is performed for all thread loops of the shader program at once using standard data flow techniques. Notably, to help assure accuracy of the liveness analysis, each thread loop is represented as OpBeginThreadLoop and OpEndThreadLoop such that there is no back edge from OpEndThreadLoop to OpBeginThreadLoop, because thread loop variables are private on each iteration.

At step 134, individual thread loops are analyzed and optimized. For each thread loop being optimized, the algorithm computes thread loop helper sets that will be referred to as MayReachTLLoopDef and UE, as described below. At step 136, the result of steps 132 and 134 are used. For each t-loop, Load and Store sets are computed according to the equations below. Finally, at step 138, the Load and Store sets are used to generate efficient executable code (with unnecessary loads and stores removed from thread loops) or reduce the number or loads and stores if the IR code is being interpreted. The Load and Store sets are compiler analysis data used for optimization and are not used in the final executed code. In other words, when just-in-time compiling, the Load and Store sets specify exactly which variables of the shader program to load and store (i.e., which load/store instructions to generate in the machine code), and the information they formerly contained is embedded into the code by issuing significantly fewer loads and stores.

As mentioned earlier, it will be assumed that a compute shader has already been partitioned into thread loops to respect the original source code synchronization. In a compute shader, each scalar variable is private to a thread. Thus, all variables must be conceptually replicated for correctness. One approach would be to use an array v[T] for each original variable v. Then a statement $x=y+1;$ is transformed into ---
for all threads do
    x[t] = y[t] + 1;
end t-loop
---

However, if original scalar accesses are lowered to array/pointer accesses too early in the intermediate representation, the later compiler analysis becomes an order of magnitude harder. Instead, a set of scalar temporary variables are used to execute one iteration of a t-loop (here, "scalar" means "non-array", because the variables may be vector variables in a vectorized code). The x=y+1 example would then be transformed to:

---
for all threads do
    load x[t] into x
    load y[t] into y
    x = y + 1;
    store x into x[t]
    store y into y[t]
end t-loop
---

Using scalar temporaries would yield even more effective results when variables are used and defined many times within a t-loop, since v[t] access is more expensive than a scalar access and a compiler can use standard scalar optimization techniques. Load and store of a temporary are implementation-specific. For example, the temporaries may be indexed into a piece of memory that is not managed by the compiler.

For correct execution, the values of scalar temporaries should be captured at the end of each iteration of the current t-loop, such that the memory state is properly carried forward to the following t-loops. This is why the helper variables are called temporary—they may be redefined on the next iteration of the t-loop. However, notice that the state of a temporary should be preserved only if it may be used in a different t-loop that follows in execution. Otherwise, the corresponding store operation is redundant. Similarly, an implementation should load only those variables at the beginning of each iteration of a t-loop that may be used or defined (to properly merge values on exit by computation inside t-loop. Following is an example that illustrates the optimization:

---
begin main subroutine
    y = read a value from a UAV;
    barrier;
    x = y + 1;
    barrier;
    y = x * 2;
    write y into a UAV;
end main subroutine
--- should be transformed into

---
begin main subroutine
    for all threads do
        // do not load any temporary
        y = read a value from a UAV;
        store y into y[t]
    end t-loop
    for all threads do
        // do not load x, because there is no use
            of x inside the t-loop
        load y[t] into y
        x = y + 1;
        store x into x[t]
        // do not store y, because the value of y
            // will not be used in following t-loops
    end t-loop
    for all threads do
        load x[t] into x
        // do not load y, because there is no use of y
            // inside the t-loop (only a definition)
        y = 2 * x -continued

```
        write y into a UAV
        // do not store any temporaries because they
        // are dead
    end t-loop.
```

To formalize, each t-loop is annotated with two sets of temporary variables: the Load set represents all variables that need to be loaded at the very beginning of a t-loop iteration, and the Store set represents all variables that need to be stored at the very end of each iteration. For each t-loop (TL), the sets are computed as follows:

$$Store(TL)=LiveOnExit(TL) \cap MayDef(TL),$$

$$Load(TL)=MayReachTLoopDef(TL) \cap ((LiveOnEntry(TL) \cup UE(TL)) \cup Store(TL)).$$

The LiveOnEntry(TL) and LiveOnExit(TL) sets represent all live variables on entry and exit from the t-loop, respectively. Note that a t-loop is represented by a pair of IR operations: OpBeginThreadLoop and OpEndThreadLoop, and there is no back edge from OpEndThreadLoop to OpBeginThreadLoop because variables are privatized for each thread. These sets can be computed applying standard liveness analysis on the entire program. MayDef(TL) is the set of all variables that may be defined during execution of the TL, either by a statement nested in t-loop or via a call chain. UE(TL) is the set of variables that are upward-exposed with respect to TL. The set is computed as a union of UE sets of all basic blocks nested in TL as well as UE sets of subroutines that may be invoked during execution of the t-loop. The MayReachTLoopDef(TL) set is the set of all variables that may be stored in some t-loop and may reach the very beginning of TL. These sets can be computed as the meet over all path fixed point solution using iterative data-flow analysis with the following equations:

$$\text{Initialize MayReachTLoopDef(TLoopEndBB)=Store}(TL),$$

where TLoopEndBB is the basic block that correspond to the end of TL; for any other basic block B: MayReachTLoopDef(B)=∅; and $$MayReachTLoopDef(B)=\cup_{P \in Pred(B)} MayReachTLoopDef(P)$$

The first part of the Load set equation takes care of upward-exposed variable uses, whose values may be reached by definitions of the corresponding variables that are in some t-loop's Store set. The second part takes care of properly merging a definition of a variable, nested in control flow within t-loop, at the end of the thread loop.

For a typical compute shader, the size of Load and Store sets is only a small fraction of all program variables. Therefore, the optimization significantly reduces the overhead associated with the thread loops due to reduction in the number of memory accesses. For real compute shaders, orders of magnitude performance improvements have been observed over a naïve implementation.

Alternatively, it is possible to compute the Load and Store sets using a single static assignment (SSA) form; however, construction of an SSA could increase the time for just-in-time compiling.

Reducing Size of a Thread Loop

A frequently-found pattern in high-performance compute shaders is to perform a piece of work, which would produce the same result for all threads, by a single thread, store the results into shared memory, synchronize, and read the values from shared memory by all threads. This may save a lot of computation, especially if the operations executed by a single thread are expensive, e.g., divisions or global memory accesses. Here is the pseudo-code:

```
    if (t == 0)
        // Do some work by thread 0 and store results into
        shared memory, e.g., setup indexes using divisions
        barrier
        // All threads do some work, using values cached in
        shared memory by thread 0
```

This will be transformed into:

```
    for all threads do
        if (t == 0)
            // Do some work by thread 0 and store results in
            shared memory, e.g., setup indexes using divisions
        end of t-loop
    for all threads do
        // All threads do some work, using values cached in
        shared memory
    end of t-loop
```

An efficient optimization is to reduce the trip count (number of loop iterations) of the first t-loop to one, because all threads, but t=0, do nothing. That would eliminate t-loop and replace it with linear code, representing computation of thread 0. The optimization also reduces t-loop load and store overhead for private temporaries for all, but the first, iterations. Similarly, the t-loop trip count can be limited to a range, assuming the range expressions are analyzable by the compiler.

Caching Compute Shader Thread Indices to Avoid Excessive Divisions

A compute shader index within a thread block may have up to 3 dimensions (tx, ty, tz); let the bounds be (Tx, Ty, Tz). To properly enumerate thread loop iterations, it is possible to use a triply-nested loop on tz, ty, and tx, but such code is unlikely to be fast due to more complex compiler analysis that would be required. Furthermore, the code is likely to be vectorized and if (ti % W)≠0 (W is vector width), there are partially-filled vectors, which reduce efficiency of computation. The approach to be used is to linearize the thread index t=tz*(Tx*Ty)+ty*Tx+tx and run a t-loop with t∈[0, T), T=Tx*Ty*Tz. This is acceptable for the case when Tz==Ty==1, because then tx==t. Otherwise, the thread index (tx, ty, tz) needs to be reconstructed from t:

$$tz=t/(Tx*Ty);$$

$$t1=t-tz*Tx*Ty;$$

$$ty=t1/Tx;$$

$$tx=t1-ty*Tx.$$

Thread index retrieval is a common operation in compute shaders and having two divisions will likely not be acceptable. To reduce the cost of thread index computation, pre-compute three arrays atx[T], aty[T], and atz[T] and keep them as part of the shader state. The arrays are used to reconstruct the thread index (atx[t], aty[t], atz[t]) via array accesses, which is less costly. Furthermore, the same arrays are used by all thread blocks that execute the shader, resulting in a good performance gain.

CONCLUSION

Figure 3:
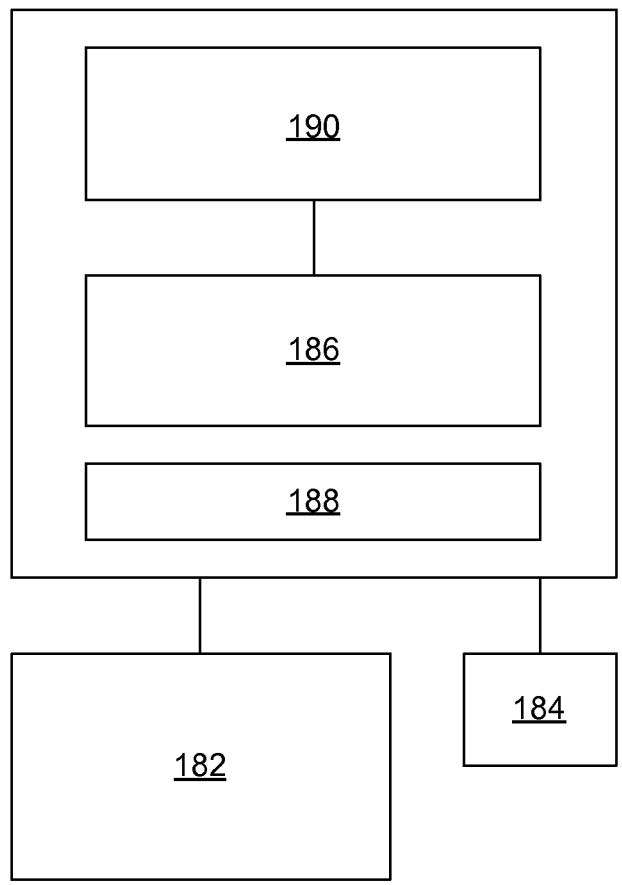
FIG. 3 shows a computing device.

FIG. 3 shows a computing device 180. The computing device 180 is an example of a type of device that can perform embodiments described above. The computing device 180 may have some or all of the following: a display 182, an input device 184 (e.g., keyboard, mouse touch sensitive area, etc.), a CPU 186, a GPU 188, and storage media 190. These components may cooperate in ways well known in the art of computing.

Embodiments and features discussed above can be realized in the form of information stored in volatile or non-volatile computer or device readable storage media. This is deemed to include at least physical storage media such as optical storage (e.g., compact-disk read-only memory (CD-ROM)), magnetic media, flash read-only memory (ROM), or any means of physically storing digital information (excluding carrier waves, signals per se, and the like). The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The term media as used herein refers to physical devices and material and does not refer to signals per se, carrier waves, or any other transient forms of energy per se. The embodiments and features can be performed on any type of computing device, including portable devices, workstations, servers, mobile wireless devices, and so on.

The invention claimed is:

1. A method of optimizing intermediate representation (IR) code comprising a plurality of thread loops, the method performed by a computing device comprised of storage hardware and processing hardware, the method comprising:
receiving the IR code and storing the IR code in the storage hardware, the IR code comprising the thread loops, wherein the thread loops were generated by replacing corresponding thread blocks during de-parallelization of original IR code comprised of the thread blocks, the thread loops of the IR code comprising temporary scalar variables and operations therewith generated and inserted into the IR code during the de-parallelization of the thread blocks of the original IR code;
performing, by the processing hardware, data-flow analysis on the received IR code to identify, among the temporary scalar variables, any temporary scalar variables within thread loops and at beginnings or ends of thread loops that, according to the entirety of the IR code including the operations in the thread blocks, are temporary scalar variables that need to be loaded at the beginning of thread loops and stored on exit from thread loops; and
according to the data-flow analysis, updating, by the processing hardware, the IR code in the storage hardware, to remove load operations and store operations of the identified temporary scalar variables, wherein the updated IR code is compiled to be executed by a central processing unit (CPU).

2. A method according to claim 1, wherein sets of temporary variables are determined and used according to the data-flow analysis, the sets comprising a load set and a store set, the load set represents variables in the thread loop that need to be loaded at the beginning of each iteration of the thread loop, and the store set represents variables in the thread loop that need to be stored at the end of each iteration of the thread loop.

3. A method according to claim 2, wherein the data-flow analysis is performed on the entire shader program including the thread loops.

4. A method according to claim 3, wherein the data-flow analysis comprises liveness analysis identifying variables that are live on entry to the thread loop and variables that are live on exit from the thread loop.

5. A method according to claim 4, further comprising identifying a set of variables that are stored by the thread loop and which may reach the beginning of another thread loop.

6. A method according to claim 2, wherein the load and store sets are used to improve the efficiency of load and store operations in the IR code.

7. A method according to claim 1, wherein a thread loop contains an original variable prior to the analysis and augmenting, and whether the original variable present in the IR code prior to the analysis and augmenting, and wherein whether the original variable is stored or loaded in a temporary variable depends on a determination of whether the original variable is used inside the thread loop or is used outside the thread loop.

8. A method according to claim 1, wherein a thread loop was added during an optimization that removed synchronization barriers from a shader program and replaced the synchronization barriers with thread loops.

9. A method according to claim 1, where each thread loop is annotated with two sets of temporary variables: a Load set representing variables determined to be needed to be loaded at the very beginning of a thread loop iteration, and a Store set representing variables that need to be stored at the very end of each thread loop iteration, wherein for each thread loop (TL), the sets are computed as follows:

$$\text{Store}(TL) = \text{LiveOnExit}(TL) \cap \text{MayDef}(TL), \text{ and}$$

$$\text{Load}(TL) = \text{MayReachTLoopDef}(TL) \cap ((\text{LiveOnEntry}(TL) \cap UE(TL)) \cup \text{Store}(TL));$$

where the LiveOnEntry(TL) and LiveOnExit(TL) sets represent all live variables on entry and exit from the corresponding thread loop, respectively, where UE(TL) is the set of variables that are upward-exposed with respect to TL, where MayReachTLoopDef(TL) is the set of all variables that may be stored in some thread loop and may reach the beginning of TL, and where MayDef(TL) is the set of all variables that may be defined during execution of the TL.

10. A method according to claim 9, wherein a thread loop is represented by a pair of IR operations comprising a begin-thread-loop operation (OpBeginThreadLoop) and an end-thread-loop operation (OpEndThreadLoop), and wherein the MayReachTLoopDef(TL) set is the set of all variables, which are privatized for each thread, that may be stored in a thread loop and may reach the beginning of the thread loop, and where the sets can be computed as the meet over all path fixed point solution using iterative data-flow analysis with the following equations:

$$\text{Initialize MayReachTLoopDef}(\text{TLoopEndBB}) = \text{Store}(TL),$$
where TLoopEndBB is the basic block that correspond to the end of TL;

for any other basic block B: MayReachTLoopDef$(B) = \emptyset$; and $$\text{MayReachTLoopDef}(B) = \cup\_(P \Sigma \text{Pred}(B)) \blacksquare^k \text{MayReachTLoopDef}(P)].$$

11. A method according to claim 1, wherein the processing hardware comprises the CPU.

12. A method of optimizing compute shader thread indices to reduce divisions thereof, the method performed for converting parallel code for a GPU to code for a CPU, the parallel code comprising a thread block and a compute shader within the thread block, the thread block comprising up to three dimensions with respective bounds, the method performed by a computing device comprised of processing hardware and storage hardware, the method, when converting the parallel code to code for a CPU, comprising:

provided a thread index stored in the storage hardware, the thread index used for addressing threads in the thread block;

pre-computing, by the processing hardware, a plurality of thread index arrays and storing in the storage hardware the thread index arrays as part of a state of the compute shader, wherein the thread index arrays are available to any thread block of the compute shader in executing the compute shader, and a plurality of thread blocks of the compute shader use the thread index arrays to execute the compute shader; and using the thread index arrays by the processing hardware to reconstruct the thread index via accesses to the thread index arrays, wherein a thread index array is pre-computed such that, for a given thread index of one dimension and a given corresponding thread index array, an array element at any given index contains a thread identifier computed according to corresponding thread identifiers of the other dimensions, respectively.

13. A method according to claim 12, wherein the arrays are used by other thread blocks that execute the compute shader.

14. A method according to claim 12, wherein the thread index comprises three dimensions and there are only three of the arrays.

15. A method according to claim 12, wherein a plurality of thread loops use the same pre-computed thread index arrays.

* * * * *